United States Patent

[11] 3,558,141

[72] Inventor Shigeo Suzuki
Tokyo-to, Japan

[21] Appl. No. 682,779
[22] Filed Nov. 14, 1967
[45] Patented Jan. 26, 1971
[73] Assignee Beltek Kabushiki Kaisha
Tokyo-to, Japan
a joint-stock company of Japan
[32] Priority Nov. 25, 1966
[33] Japan
[31] 41/107571

[54] MAGNETIC RECORDING AND REPRODUCING APPARATUS
1 Claim, 1 Drawing Fig.

[52] U.S. Cl. ........ 274/4
[51] Int. Cl. ........ G11b 21/08
[50] Field of Search ........ 274/4, 11; 179/100.2CA

[56] References Cited

UNITED STATES PATENTS 2,908,769 10/1959 Fonda ........ 274/4(A)
3,054,860 9/1962 Goldmark ........ 179/100.2(CA)
3,420,965 1/1969 Townsend et al. ........ 274/11(A)

FOREIGN PATENTS 1,109,216 6/1961 Germany ........ 179/100.2(CA)
1,146,666 4/1963 Germany ........ 179/100.2(CA)
151,921 6/1953 Australia ........ 179/100.2(CA)

*Primary Examiner*—Harry N. Haroian
*Attorney*—Holman & Stern

ABSTRACT: Fine adjustments of the position of a magnetic head relative to the recording tracks of a tape in a magnetic recording and reproducing apparatus are accomplished by the combination of a support member supporting the magnetic head, a threaded shaft supporting the support member, and a mechanism for adjustably rotating the threaded shaft.

PATENTED JAN 26 1971
3,558,141
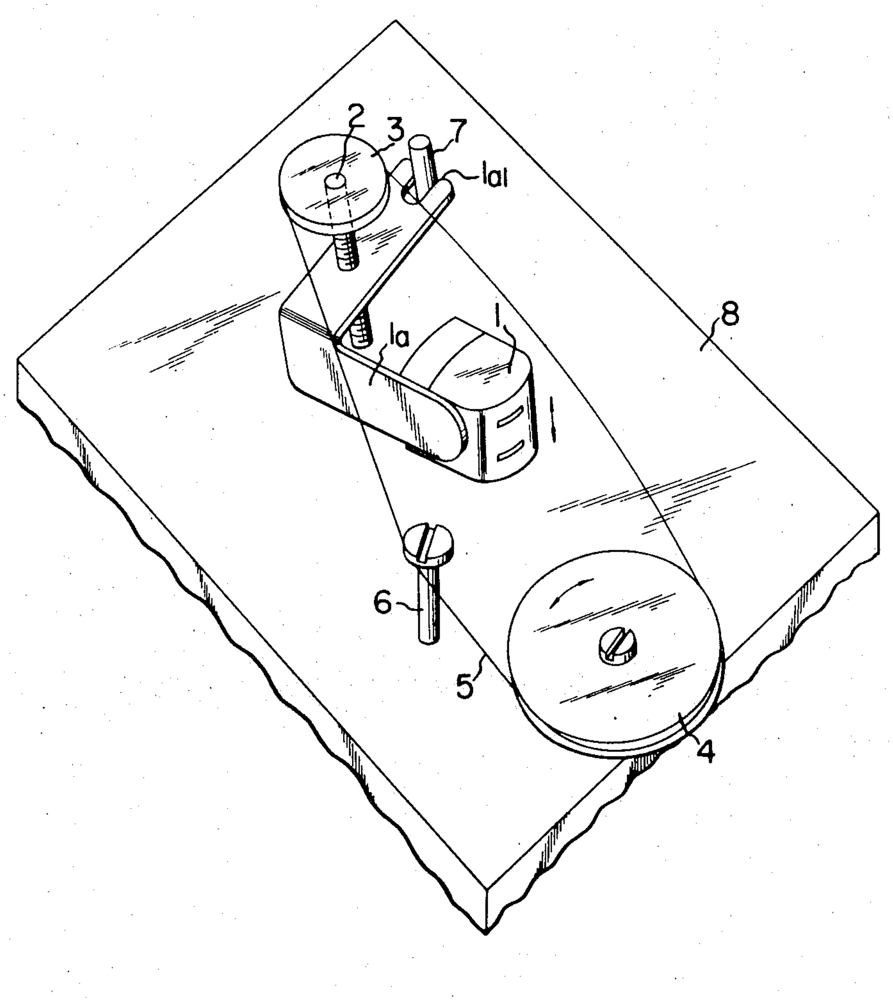
INVENTOR.
SHIGEO SUZUKI
BY
Glascock, Downing & Seebold
Attorneys

MAGNETIC RECORDING AND REPRODUCING APPARATUS

BACKGROUND OF THE INVENTION

This invention relates generally to magnetic recording apparatus and more particularly to a magnetic recording apparatus provided with a magnetic head and a new device for making fine adjustments of the position of the magnetic head.

Recently, various recording tape cartridges have appeared on the market. However, the spacing between the recording tracks of the tapes in some of these cartridges differ, and for this reason tracking errors arise whereby the recorded sound quality is impaired. In order to overcome this difficulty, it is necessary to accomplish fine adjustment to obtain an accurate positional relationship between the tape and the magnetic head.

An object of the present invention is to provide a relatively simple device for accomplishing fine adjustment of the position of the magnetic head of a recording and reproducing apparatus with respect to the recording tracks of a tape used in the apparatus.

According to the present invention, briefly summarized, there is provided, in a magnetic recording and reproducing apparatus having a magnetic head, a device for fine adjustment of the position of the magnetic head with respect to the recording tracks of a tape used in the apparatus, which device comprises a movable support member supporting the magnetic head, a mechanism for adjustably moving the support member to accomplish the fine adjustment, and a device for driving the mechanism.

BRIEF DESCRIPTION OF THE DRAWINGS

The nature, principle, details, and utility of the invention will be more clearly apparent from the following detailed description with respect to a preferred embodiment of the invention when read in conjunction with the accompanying drawing, in which the single FIG. is a diagrammatic perspective view showing one example of a magnetic sound recording and reproducing device embodying the invention.

DETAILED DESCRIPTION OF THE INVENTION

Referring to the drawing, the magnetic sound recording and reproducing device is provided above a base plate 8 constituting an operational table with a magnetic head 1 mounted on an arm of a support member $1_a$ having in an intermediate part thereof internal screw threads in engagement with outer screw threads of a vertical shaft 2. The support member $1_a$ is thus supported in a vertical direction by the shaft 2. The shaft 2 is held upright by means such as a nut (not shown) fixed to the base plate 8.

The support member $1_a$ is provided with an arm having at its end a slot $1_{a1}$ which is slidably engaged with a vertical guide post 7 fixed to the base plate 8. The guide post 7 serves for preventing the support member $1_a$ from rotating about the axis of the shaft 2 and for guiding the slotted end of the support member $1_a$ in a vertical movement.

A rotating wheel 3 is fixed to the upper end of the shaft 2 and is coupled to an adjusting wheel 4 by a strong cord 5 such as a nylon string stretched around the wheels 3 and 4. A vertical guide post 6 for the cord 5 is provided on the base plate 8.

Thus, the rotating wheel 3 rotates together with the shaft 2. When the adjusting wheel 4 is rotated by any means such as, for example, a spring motor or electric motor which is not shown, its rotation is transmitted through the cord 5 to cause the rotating wheel 3 and, therefore, shaft 2 to rotate. Since the support member $1_a$ is prevented from rotating by the guide post 7 as described above, the shaft 2 thereby rotates relative to the support member $1_a$, whereby the support member $1_a$ and, therefore, the magnetic head 1 mounted thereon are caused to move vertically by the screw drive.

Thus, a fine adjustment of the vertical position of the magnetic head 1 is made possible for accurate positioning of the head relative to the sound tracks on the recording tape.

In some cases, it is necessary to change over the magnetic head between a four-track tape and an eight-track tape. While I have previously proposed for such cases a mechanism capable of accomplishing simultaneously switching of the magnetic head from one track system to the other and the switching of position, the device of the present invention can be applied also to such cases to accomplish fine adjustment of the magnetic head.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

I claim:

1. In a magnetic recording and reproducing apparatus having a magnetic head for operating in cooperation with a magnetic recording tape provided with recording tracks, a device for fine adjustment of the position of said magnetic head with respect to said recording tracks, which device comprises, in combination: an adjustably movable support member supporting the magnetic head and having a part with internal screw threads and an arm; a threaded shaft screw engaged with said internal threads and supporting said support member, rotation of said shaft causing the magnetic head to move in the directions for said fine adjustment; a rotating wheel fixed to the shaft; an adjusting wheel remotely disposed from said rotating wheel and rotatively coupled thereto by a cord stretched around the two wheels; and a fixed guide member with which said arm of the support member is slidably engaged, and said guide member functioning to prevent rotation of the support member about the axis of the shaft while permitting the same to move in the axial direction of the shaft, whereby adjusting rotation of the adjusting wheel is transmitted through the cord and the rotating wheel to rotate the shaft thereby to accomplish said fine adjustments.